United States Patent Office.

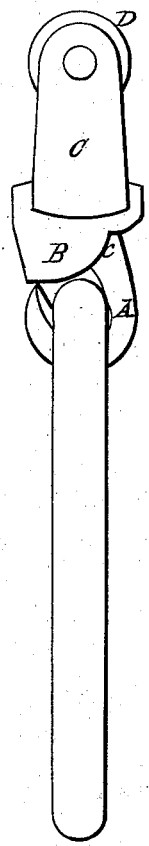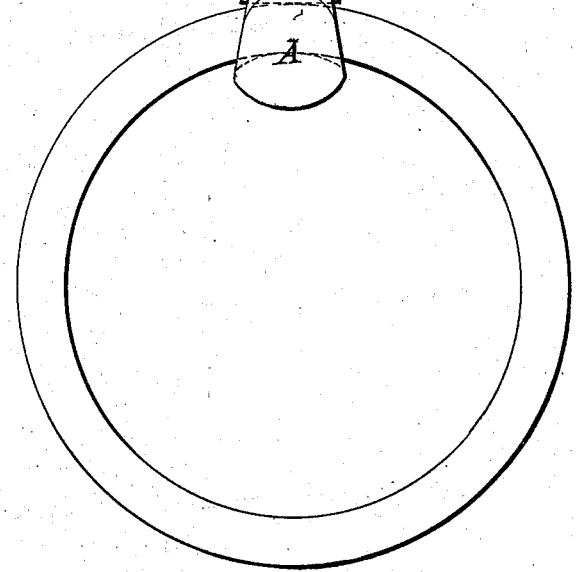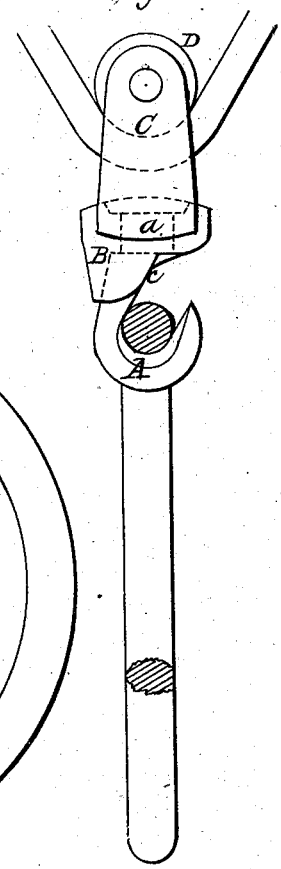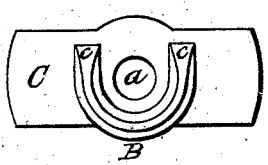

HENRY F. WILLSON, OF FORT WAYNE, INDIANA, ASSIGNOR TO HIMSELF AND GEORGE ESMOND, OF THE SAME PLACE.

Letters Patent No. 67,934, dated August 20, 1867.

IMPROVED BREAST-STRAP SHIELD.

*The Schedule referred to in these Letters Patent and making part of the same.*

TO ALL WHOM IT MAY CONCERN:

Be it known that I, HENRY F. WILLSON, of Fort Wayne, in the county of Allen, and State of Indiana, have invented certain new and useful improvements in Breast-Strap Shields and Neck-Yoke Supporters; and I do hereby declare that the following is a full, clear, and exact description thereof, reference being had to the accompanying drawings, and to the letters of reference marked thereon. In the drawings—

Figure 1 is a side elevation.

Figure 2 is an edge view.

Figure 3 is an edge view.

Figure 4 is an inverted detached view.

The nature of my invention consists in so constructing breast-strap shields and neck-yoke supporters that they may be attached or detached instantaneously without the use of the more expensive, less secure and convenient appliance of snaps.

To enable others skilled in the art to make and use my invention, I will proceed to describe its construction and operation.

A represents a hook, which is constructed in the form seen in figs. 1 and 3. The shank of said hook is inserted in a socket formed in the base of the frame of the apparatus, marked $a$, and is there firmly riveted to a washer in such a manner as to form a swivel-joint, which will allow the hook to revolve freely. B represents a semicircular flange which is formed on and extends downward from the lower side of the base of the frame to the top of the hook. Said flange is formed around the shank of the hook, so that its inner side fits closely to the swell thereof, (see figs. 3 and 4.) Said flange has its ends $c\ c$ curved in the manner seen in figs. 2, 3, and 4. C represents the frame of the apparatus, which supports in suitable bearings an anti-friction roller, D, which, when the apparatus is adjusted for use, rests on and is supported by the breast-strap, as seen in fig. 3.

The operation of my invention is as follows: Hook A is adjusted to the position seen in figs. 1 and 3, (the breast-strap being turned or twisted once around.) It takes hold of the ring, when, if the operator lets the end of the neck-yoke fall to its place, the hook turns in its socket to the reverse position seen in fig. 2, and in so doing carries the ring immediately under the flange, by which it is securely retained in the hook, it being impossible for the hook to turn back without the assistance of the operator.

What I claim as new, and desire to secure by Letters Patent, is—

The revolving hook A, in combination with the flange B, the same being constructed in the manner and for the purpose substantially as described.

I also claim hook A, flange B, frame C, and roller D, the whole being combined, arranged, and constructed in the manner and for the purpose substantially as described.

H. F. WILLSON. [L. S.]

Witnesses:
GEO. ESMOND,
JOHN S. SHURICK.